United States Patent
Geiger

[15] 3,665,298
[45] May 23, 1972

[54] METAL IMPURITY DETECTOR FOR TUBULAR CONVEYOR SYSTEM

[72] Inventor: Willard L. Geiger, Chagrin Falls, Ohio
[73] Assignee: Erico Products, Inc., Cleveland, Ohio
[22] Filed: Jan. 5, 1970
[21] Appl. No.: 764

[52] U.S. Cl. ................................................................ 324/41
[51] Int. Cl. ........................................................... G01r 33/00
[58] Field of Search ..................................................... 324/41

[56] References Cited

UNITED STATES PATENTS

| | | | |
|---|---|---|---|
| 2,971,151 | 2/1961 | Mierendorf et al. | 324/41 |
| 3,061,775 | 10/1962 | Reznowski | 324/41 |
| 2,549,567 | 4/1951 | Berman | 324/41 |
| 2,237,254 | 4/1941 | Broekhuysen | 324/41 |

FOREIGN PATENTS OR APPLICATIONS 226,922  9/1958  Australia .................................. 324/40

OTHER PUBLICATIONS

Dobie et al.; Removing Tramp Iron from Chopped Hay; Electronics; May, 1954; pp. 134– 136

Schafer, C.; Choosing Industrial Metal Detectors; Electronics; June, 1951; pp. 84– 87
Broekhuysen, W.; A Practical Metal Detector; Electronics; April, 1938; pp. 17– 19

*Primary Examiner*—Rudolph V. Rolinec
*Assistant Examiner*—R. J. Corcoran
*Attorney*—Oberlin, Maky, Donnelly & Renner

[57] ABSTRACT

Apparatus for locating and removing foreign metal objects in the supply system of a plastic molding machine and the like wherein particulate plastic material is transported from a supply source at high velocity by way of a tubing system, consisting of a detector unit for monitoring the flow of the material through the tubing and a remote unit for momentarily diverting the flow when the presence of metal is detected. The diverter unit is a solenoid actuated flapper valve in the tubing system and the detector unit consists of a dual transmitter and receiver coil arrangement surrounding a part of the tubing, energized from a radio frequency energy source and arranged to develop an output signal when a transported metal object affects the normal balanced condition. Solid state components are employed throughout radio frequency oscillator, amplifier, differential detector and relay driver circuits and a balance coil and tuning slug are employed for critical adjustment of the signal balance and sensitivity in the sensing area.

4 Claims, 5 Drawing Figures

Patented May 23, 1972
3,665,298
2 Sheets-Sheet 1
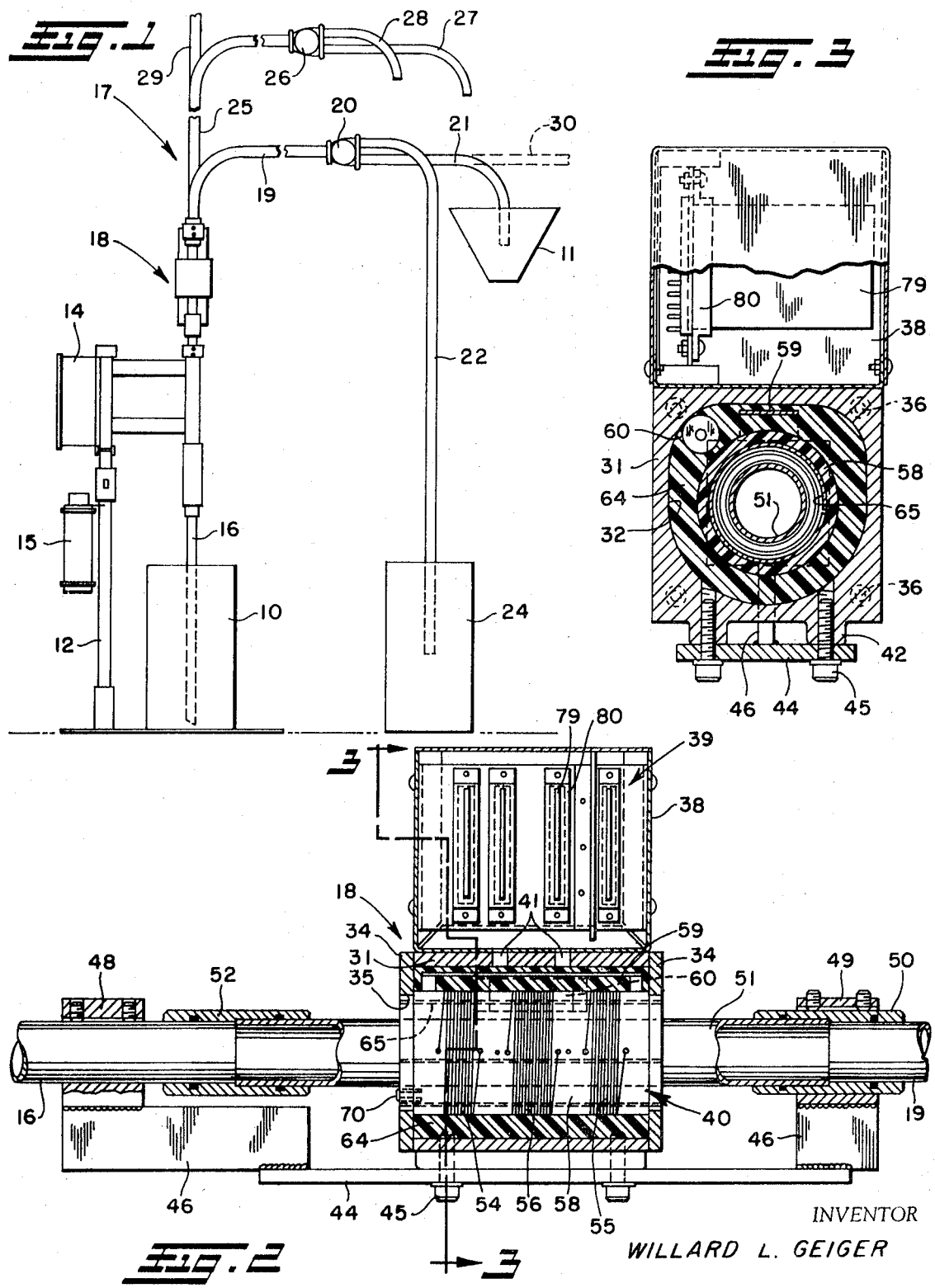
INVENTOR
WILLARD L. GEIGER
BY
Oberlin, Maky, Donnelly & Renner
ATTORNEYS

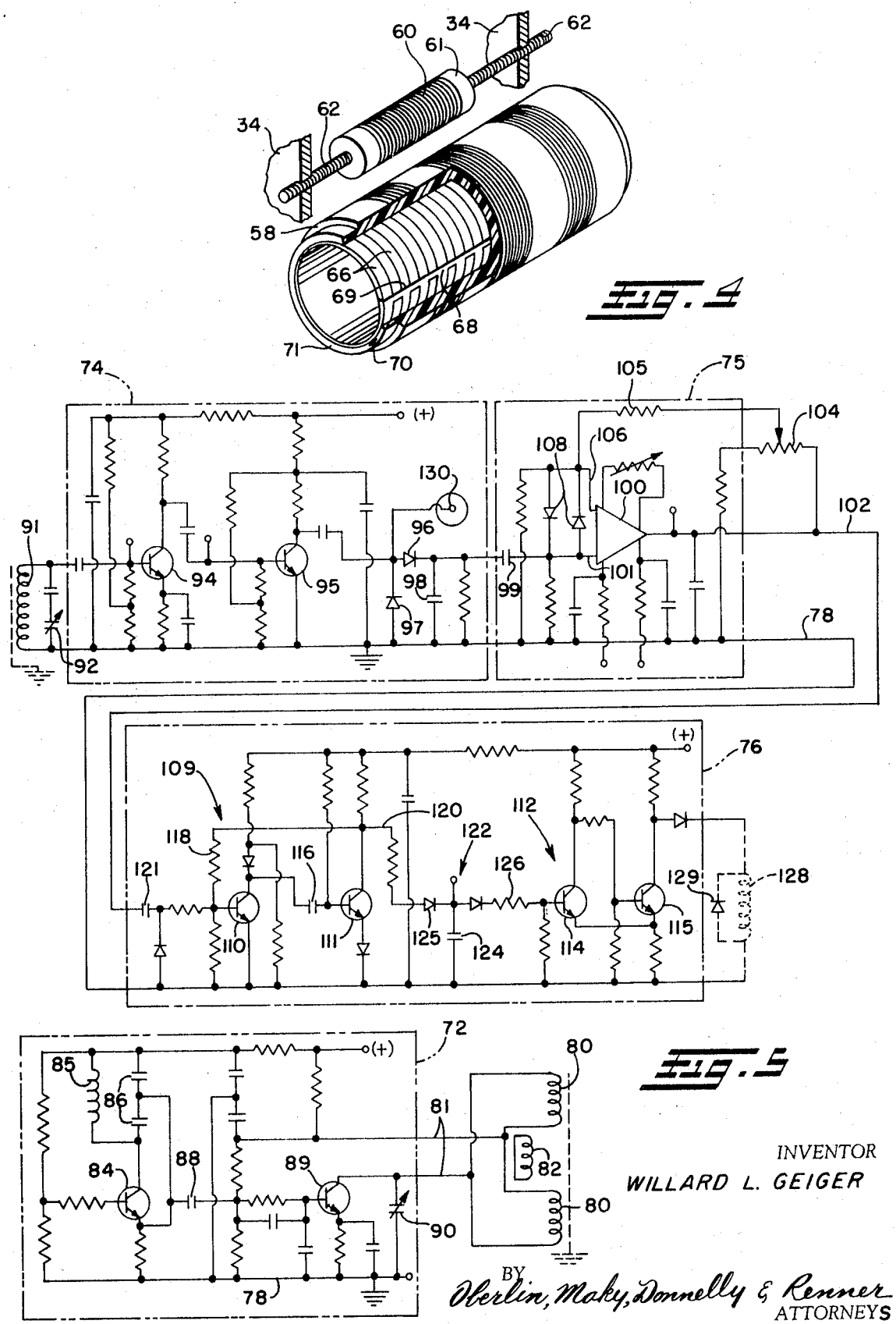

METAL IMPURITY DETECTOR FOR TUBULAR CONVEYOR SYSTEM

This invention relates to metal detector devices and more particularly to apparatus for detecting and removing metal impurities in a plastic conveyor system of the high velocity transport type.

One of the major problems in this type of equipment is the excessive down-time encountered when impurities become mixed with the plastic material being supplied to a machine, for example, an injection molding machine, causing clogging of orifices, jamming of extruder screws, damage to molds and the like. While great attention has been directed to supplying a pure material, it is almost impossible to preclude all forms of contamination and resulting damage to the machinery. This is especially true when the supply of material is reused in several process lines, undergoing a transport from several supply bins and being exposed to the environmental conditions of a typical manufacturing facility.

It has become commonplace in this field of art to transport the material in the form of pellets which are carried over relatively great distances within the shop, most conveniently by air pressure in a network of tubular supply lines. This has further accentuated the problem in that the material is transported at extremely high velocities making the detection of extraneous material more difficult and dependent upon rapid response condition.

Metal detectors have been utilized in the past including those which operate in the radio frequency range utilizing a combination of transmitter and receiver coils in an arrangement which is statically balanced and disrupted by the presence of a metal object. However, such devices for the most part are designed for a particular end use and the size of objects encountered or the environmental conditions are fairly well standardized or can be compensated for by the equipment. It is not known that the problem of detecting minute particles in a system where the particles are transported at an extremely high velocity has been solved in the past nor that of separating the particles detected from the material which is in normal transport. Additionally, the design considerations of such a system are further more restrictive in that it is not known what type of particles may be encountered, ranging in size from a small shred of wire to a large bolt or the like and variable in velocity dependent upon the aerodynamic characteristics and denseness thereof.

Therefore it is a specific object of this invention to provide metal detector apparatus which is highly sensitive and can accommodate many different sized of particles.

It is another object of this invention to provide metal detector apparatus which not only detects foreign metal objects but also removes same in a highly responsive system.

It is yet another object of this invention to provide metal detector apparatus which is especially suited for utilization in a tubular conveyor system wherein particulate plastic material is transported via a known route over a considerable distance.

It is still another object of this invention to provide metal detector apparatus which includes a novel arrangement of coils for establishing and detecting variations in a radio frequency energy field.

It is yet another object of this invention to provide metal detector apparatus which includes a novel scheme for balancing the coils and for offsetting the balanced condition to further sensitize the apparatus.

It is a further object of this invention to provide metal detector apparatus having an electronic portion constructed entirely of solid-state components thereby realizing efficiency and economy of operation and a highly reliable system.

Although the preferred embodiment of this invention relates to apparatus for removing foreign metal objects from a particulate plastic conveyor system, it will be apparent to those skilled in the art that the teachings of this invention may be adapted for the sensing of metal objects in many different types of environments wherein an extremely sensitive or economical form of apparatus is desired.

IN THE DRAWINGS

FIG. 1 is an environmental showing of the apparatus of the invention in relation to a tubular conveyor system for plastic material;

FIG. 2 is an elevational view of the detector head and mount therefore, partly in cross section;

FIG. 3 is a partial cross-sectional view of the detector head taken along the line 3—3 of FIG. 2;

FIG. 4 is a perspective view of part of the detector head with parts broken away to show the construction of the interior portion; and FIG. 5 is a schematic diagram of the electronic portion of the invention.

Referring now to FIG. 1, there is shown the apparatus of the invention in conjunction with a tubular conveyor system for transporting particulate plastic material from a source of supply which in this instance is a drum 10 filled with the material to a receptacle 11 associated with a utilization device, the latter being a chute adapted for the loading of a machine which may be a plastic injection molding machine. Located on a tubular standard 12 adjacent the supply drum 10 is a control box 14 for energizing the system and means 15 for supplying air under pressure to the tubing system. Thus the plastic material is drawn into a supply tube 16 from the supply drum 10 under vacuum developed from a venturi tube and is carried under pressure through the tubing system 17 to any number of utilization devices as indicated by the plural arrangement depicted in FIG. 1.

At a convenient location near the supply drum 10 is the metal detector head 18 which is adapted to be exposed to the plastic material which is transported throughout the system. The detector head 18 is coupled directly into and forms a part of the tubing system 17 and in this embodiment of the invention is adapted to monitor the flow of plastic material to all branches of the tubing system.

The first branch of the system 17 comprises a length of tubing 19 coupled at one end to the detector head 18 and at the other to a diverter gate 20 which is a solenoid operated valve operative to allow the normal flow of plastic material to the receptacle 11 by way of tubing 21 or in response to an electrical signal to divert the material by way of return tubing 22 to a reject container 24. Alternatively, the return tubing 22 could be directed back to the supply drum 10 so that the plastic material would be continuously recirculated to eventually concentrate all impurities in the supply drum 10. It will be apparent that due to the high velocity of transport of material in the system, the exact location of the impurity will not be known except that it will be at some point in or beyond the detector head 18. Therefore the location of the diverter gate 20 is selected so as to be separated sufficiently from the detector head 18 to accommodate the fastest moving impurity and by means of circuitry to be described in more detail hereafter is operated for a length of time sufficient to remove even the slowest moving particle of impurity from the system.

A second length of tubing 25 is coupled at the output side of the detector head 18 by means of a Y coupling or the like (not shown) to transport material in the second branch of the tubing system 17 which also may include a diverter gate 26 and further tubing 27, 28 for supplying a second machine in a process line and for returning the plastic material to the reject container 24. Further branches of the tubing system 17 may be accommodated in a similar manner as indicated by the tubing 29 extending from the supply line. As indicated in FIG. 1, the distance of the diverter gates 20, 26 in branches 1 and 2 may be located so as to be substantially equidistant from the detector head 18 so that an equal quantity of the material is diverted from each of the branches. While FIG. 1 represents a preferred embodiment of the invention, it will be apparent to those skilled in the art that alternative configurations are possible for associating the apparatus of the invention with a conveyor system. For example, only a single detector head 18 and diverter gate 20 could be utilized in a common supply line for a plurality of branches, the coupling to the various branches being effected beyond the diverter gate 20 as at 30 and similarly multiple detector heads may be employed each in conjunction with its associated diverter gate.

The types of metal impurities encountered in this type of system are often so minute and travel at such extreme velocities that conventional forms of metal detectors are impractical for use in such system. Additionally, it is desired to monitor the passage of impurities in the system without substantially obstructing or affecting the normal flow of material so that any physical contact with a material is to be avoided as a source of introduction of additional impurities.

Referring now to FIGS. 2–4 there is shown in cross-sectional and perspective views the details of the detector head 18 and the mounting configuration of same with respect to the tubular conveyor system 17. The detector head 18 comprises a cast, generally rectangular housing 31 of substantially square cross-section having an essentially circular cavity 32 extending axially therethrough, the cavity being somewhat flattened at the top to accommodate the mounting of components therein. A pair of end plates 34 having circular openings 35 therein form the end portions of the housing 31 and are mounted in place by means of bolts at the locations 36. Mounted above the housing 31 in a sheet metal enclosure 38 is the electronic portion 39 of the apparatus while the sensing portion 40 is located within the housing 31, communication between the two being made by electrical wiring passing through apertures 41 in the housing 31.

The housing 31 includes a pair of axially extending bosses 42 at the lower portion thereof and is adapted for mounting on a support plate 44 being retained in place by bolts 45. The support plate 44 is welded to a pair of webs 46 at either end which in turn support a pair of sleeves 48, 49 for mounting on the tubing of the conveyor system. The sleeves 48, 49, webs 46 and plate 44 are adapted to support the housing 31 in axial alignment with the tubing, clamping being effected between sleeve 48 and the inlet tubing 16 by means of set screws while sleeve 49 is clamped to the outlet tubing 19 by means of an intermediate sleeve coupling 50.

A sensor tube 51 of plastic material is located between the inlet and outlet tubes 16, 19 an is supported and retained in place by the friction type sleeve couplers 50, 52 at either end, each including O-ring gaskets, for sealing purposes. Thus, the sensor tube 51 provides a location for monitoring flow of the material and provides an unobstructive sealed path for the material.

Located within the housing 31 and adapted for support of the two transmitter coils 54, 55 and receiver coil 56 is a coil form 58 which preferably is a length of polyvinyl chloride rigid pipe having a reduced diameter at either end for engagement in the holes 35 in the end plates 34. Thus the coil form 58 is mounted substantially coaxially with the sensor tube 51, the former being of substantially greater diameter to allow suitable clearance for the components.

The means for establishing and detecting variations in the field of energy comprise the group of three coils wound on the coil form 58, being substantially equally spaced from one another and comprising transmitter coils 54, 55 adjacent either end of the coil form 58 and the receiver coil 56 centrally located therebetween. Each of the coils comprises a number of turns of copper wire, the transmitter coils 54, 55 preferably having an identical number of turns, with the ends of the coil turns being embedded, as indicated, in the coil form itself for retaining the coils in position.

Although all of the coils 54–56 are shown as being wound in the same direction it will be appreciated that it is desired to establish a static radio field of energy within the confines of the coil form 58 and thus within the sensor tube 51 which is opposite in phase so as to achieve a nulling effect in the centrally located receiver coil 56. As will be described in more detail hereinafter the transmitter coils 54, 55 are energized from a common RF generator and the phase reversal can easily be accommodated by the polarity of the connection. Although not shown in FIG. 2 the ends of each of the coils are wired to a printed circuit board 59 for connection in turn to the electronic portion 39 of the circuitry via the apertures 41 in the housing, the printed circuit board being firmly mounted on the coil form and elevated over the coils 54–56 by means of a pair of bosses.

In operation substantially oppositely directed fields of radio frequency energy are supplied from the transmitter coils 54, 55 to effect the signal output from the receiver coil 56 and the construction of the sensing apparatus is such that the output of the receiver coil 56 is approximately at a null condition in the absence of an unbalancing effect upon the fields of energy. Normal transit of the plastic material occurs from the inlet tube 16 through the sensor tube 51 to the outlet tube 19 and to the remainder of the tubular conveyor system 17, impetus being afforded by air under pressure so that the particulate plastic material and any impurities associated therewith are carried through the radio fields of energy. It will be apparent that for any established balanced condition of transmitter and receiver coils a change in output signal of the receiver coil 56 will occur upon the passage of a particle of metal so as to momentarily upset the balance of the energy field and induce a different voltage in the receiver coil winding. Any type of conductive material will create this momentary unbalanced condition and can be discriminated from the passage of the plastic material which is substantially non-conductive. Both particles of the type that are magnetically susceptible and those which are capable of conducting an electric current will have an influence on the magnetic field, in absorbing energy of the field or in setting up eddy current loops within the particle itself which will cause an induction of voltage in the receiver coil as the particle passes through the detector head 18.

While in theory the transmitter and receiver coils can be accurately wound and located so as to achieve a balanced condition, in practical application such sensitive detection is required that additional means must be provided for achieving the optimum balanced condition and required sensitivity level of the detector unit. Thus in this apparatus a fourth coil 60 is utilized for achieving a critical balance of the apparatus, such balance coil 60 comprising a winding of conductive wire on a solid acrylic core 61 of small diameter relative to the diameter of the coil form 58. As indicated in FIG. 4 the balance coil core 61 is threaded at either end and receives brass screws 62 which in turn are threadedly engaged in the end walls 34 of the housing to dispose the balance coil 60 on an axis substantially parallel with the axis of the coil form 58 but offset therefrom so as to be situated in spaced relation between the coil form 58 and the inner periphery of the housing 31.

It will be clear then that the brass screws 62 may be turned from a location outside the housing 31 so as to effect a linear displacement of the balance coil 60 with respect to the position of the transmitter and receiver coil windings. The balance coil 60 is a multi-turn coil with the end terminals connected together to provide a circuit which is broadly resonant approximately in the range of 300 to 600 KHz. The effect of the balance coil 60 is not only to balance voltage output, but also to adjust the Q of the tuned circuit formed by the transmitter and receiver coils.

After a critical adjustment of the balance of the detector head the brass screws 62 can be cemented in place to prevent further movement of the balance coil 60, however in the preferred embodiment of this invention as depicted in FIG. 2 a potting compound is utilized to preserve the position of the balance coil. In this arrangement the potting compound 64 which may be a polyurethane foam or other suitable material is introduced into the cavity 32 of the housing 31 by means of a suitable aperture in one end wall 34 so as to completely fill the space between the exterior of the coil form 58 an the inner periphery of the housing 31. Such arrangement serves not only to retain the position of the balance coil 60, but also secures the windings on the coil form 58 as well as the coil form itself with respect to the housing 31 and provides effective damping against vibration effects. In this embodiment preferably the brass screws 62 are withdrawn from the balance coil form 61 and the end walls 34 of the housing so that the balance coil 60 is supported entirely by the potting compound.

Further forming a part of the detector head 18 is a Faraday shield 65 which is disposed adjacent the inner periphery of the coil form 58 to provide a barrier against the effect of electric charge movements from upsetting the balanced condition of the coils.

The Faraday shield 65 comprises a plurality of axially spaced bands 66 of conductive material disposed throughout the length of the coil form, 58, all of the bands 66 being electrically interconnected to one another and to a common ground connection for the circuit. In this embodiment of the invention the Faraday shield 65 is conveniently formed from a flexible Teflon-backed copper sheet in which parts of the copper are etched away using conventional printed circuit board forming techniques to leave the bands 66 of copper and provide the axially extending electrical interconnection 68 at one end of the sheet. As indicated in FIG. 4 the sheet may then be rolled into tubular form and placed within the coil form 58, the sheet being of suitable dimension so as to have the ends in abutment as indicated at line 69. Electrical connection may then be made to the shield 65 through a hole in the coil form 58 to the printed circuit connecting board 59 by means of conductive wire.

Once the balance of the sensing head 18 has been critically adjusted it is desirable to offset such balance condition by a known amount so as to sensitize the detecting circuitry to a point just below the triggering level. In this manner the apparatus can be optimized in sensitivity so as to be responsive to any minute particle which may be only a shred of wire and which is moving at an extremely high velocity. This final trimming of the circuit is effected by the placement of a slug 70 of U-shaped steel wire into the edge 71 of the coil form 58 which location is accessible outside the housing 31 and which may be performed after the potting has been completed. The metal slug 70 is placed into axially extending predrilled holes in the coil form 58 and may be adjusted in length to obtain the desired offset of the electromagnetic field and preferably such slug 70 is glued or otherwise bonded in place as a permanent part of the apparatus.

Referring now to FIG. 5 and the diagram of the electronic portion of the apparatus, there is shown in dashed lines an oscillator section 72, an amplifier 74, a differential amplifier 75 and a trigger and relay driver circuit 76. A conventional power source (not shown) is utilized to obtain appropriate voltage levels for use throughout the circuits being connected as indicated to ground connections 78 and power terminals as marked. The electronic apparatus also forms a part of the detector head 18 being mounted on a group of four printed circuit boards 79 in connectors 80 which are vertically oriented in the chassis enclosure 38, the printed circuit boards 79 thus extending transversely of the coil form 58.

In FIG. 5 the coils 54–56 and 60 are depicted as inductors the transmitter coils 80 being connected in inverse parallel and adapted to receive the output from the radio frequency generator 72 by means of lines 81. The balance coil 82 is shown associated with the transmitter coils 80 and as indicated has a shorted winding.

The RF generator 72 is generally of conventional configuration comprising a first transistor 84 connected in an oscillating mode having an inductor 85 and series capacitors 86 connected to the collector electrode thereof with positive feedback to the transistor 84 to sustain oscillation at a nominal 500-KHz frequency. The output of the transistor 84 is applied by way of capacitor 88 to power transistor 89 connected in common emitter configuration having the transmitter coils 80 in series connection with the collector electrode thereof and the positive power supply. Conventionally the power transistor 89 provides not only suitable amplification of the signal but also suitable isolation between the oscillator transistor 84 and the transmitter coils 80. A variable capacitor 90 is connected between the collector electrode of the output transistor 89 and ground connection 78 and provides a means of resonating the transmitter coil circuit to the frequency of oscillation of the oscillator transistor 84. While the frequency of 500 KHz is selected as optimum for this circuit it is apparent that many other operating points can be accommodated utilizing the teachings of this invention.

The receiver coil 91 is indicated as an inductor having a tuning capacitor 92 in shunt connection thereacross being coupled to the input of the two stage RF amplifier 74 comprising transistors 94, 95 in common emitter configuration. AC coupling is used throughout the circuitry which receives emphasis in the biasing arrangement so as to produce maximum gain of the received signal while minimizing effects of drift and voltage variations. An initial detection of the received signal is performed at the output of transistor 95 in circuitry comprising series connected diode 96 and shunt connected diode 97 and capacitor 98. In effect then only the positive components of the received signal are accumulated in the capacitor 98 and transmitted to the differential amplifier 75 by way of coupling capacitor 99.

The differential amplifier 75 comprises an integrated circuit amplifier 100 of the high gain wide band type which receives the detected signal at the non-inverting input 101 to provide an output signal on line 102. Feedback is employed by way of potentiometer 104 and series connected resistor 105 to the inverting input 106 of the integrated circuit amplifier 100 to provide a circuit having a high common mode rejection which is suitable for obviating the noise signals which are common to both inputs. Back to back diodes 108 are connected across the inputs 101, 1-6 of the 106 100 to prevent overdriving of same and the amplifier acts essentially as a zero level input amplifier to produce the desired output signal. The output of the differential amplifier 75 then is a relatively large signal in the presence of a detected object and substantially no signal below a predetermined level of signal received.

The relay driver circuitry 76 includes a one-shot circuit 109 comprising transistors 110, 111 and the Schmitt driver circuit 112 comprising transistors 114, 115. The collectors of the transistors 110, 111 in the one-shot circuit are cross-coupled by capacitor 116 and resistor 118 to provide a positive output signal on line 120 of predetermined duration dependent on the discharge characteristics of the circuit when a signal of sufficient amplitude is received at the input by way of coupling capacitor 121. The timing afforded by the one-shot circuit 109 as previously described determines the interval of diversion of the gate valve 20 for shunting the material from the conveyor system 17. The output of the one-shot circuit 109 is then applied to an accumulator circuit 122 comprising shunt connected capacitor 124 by way of diode 125 to provide a signal indicative of the presence of a metal impurity as a voltage appearing across the capacitor 124.

In the Schmitt trigger circuit 112 the transistors 114, 115 are directly coupled to provide the conventional function of regenerating the input signal received by way of resistor 126 upon its attaining a predetermined level to provide an output signal at the collector of transistor 115 which signal has an extremely steep wave front and fast fall time. The Schmitt trigger circuit 112 provides a low source impedance for driving the load rapidly and reliably.

The load 128 comprises the solenoid in the gate diverter 20 and is indicated in FIG. 5 as an inductor having a diode 129 in shunt connection thereacross to prevent voltage spikes upon collapse of the magnetic field. The diverter gate 20 is energized by a rotary solenoid which is spring biased in one direction and is moved to the second position upon receipt of the signal from transistor 115. In typical operation and as a continuous check upon the operability of the system the solenoid load 128 is normally energized to close the gate valve 20 to the position wherein the material from the supply drum 10 is directed to the receptacle 11. In the presence of a metal impurity detected by the electronic circuitry power is removed from the solenoid load 128 and the gate valve 20 is moved under the influence of the spring bias to the position where the material is returned to drum 24. It is essential not only that the electronic circuitry but also the diverter gate 20 itself be highly responsive in order to divert the flow of material and return to the normal operating condition in a rapid and highly repeatable manner. Since the actual physical location of the metal impurity is dependent upon the weight and size of the particle as previously described, in order to completely remove all impurities and not appreciably disrupt the established flow pattern, while accommodating repeated actions for a plurality of detected particles, it is necessary to have highly responsive and repeatable characteristics for the system.

In this system, it is essential that even the smallest metal particles be detected so as to prevent damage to machinery being supplied by the tubing system 17 and although unique apparatus has been described for achieving a signal output from a metal particle while discriminating against noise emanating at least partly from the flow of plastic material which may carry a static charge through the detector head assembly, further means are employed for sensitizing the apparatus for the detection of these particles. As previously described, this comprises a tuning slug 70 embedded in the end of the coil form 58, such adjustment being made after the detecting assembly is tuned to a critical balance point. In effect a piece of metal material is introduced into the detector head 18 and the output of the system is monitored at test point 130 to determine the effect of the introduced particle. By monitoring the voltage at test point 130 and recognizing the triggering level of the system at which the solenoid is deenergized, the length of the metal slug 70 may be trimmed until the voltage output is attained which is only slightly below the triggering voltage. Because of the construction of the apparatus and the highly reliable electronic circuitry utilized, such adjustment may be performed prior to installation of the detecting assembly in a tubing system and reliable results can be obtained.

I, therefore, particularly point out and distinctly claim as my invention:

1. Apparatus for detecting metal impurities transported with plastic material in a tubular conveyor system, comprising a metallic housing, a pair of end plates having central apertures therein secured to said housing, a tubular coil form received in said apertures for support in axial disposition within said housing and adapted to surround a portion of the conveyor system, a pair of transmitter coils wound on said coil form for establishing a magnetic field, a receiver coil wound intermediate said transmitter coils and subject to unbalance in said magnetic field for developing a signal, a second cylindrical coil form having a shorted balance winding thereon disposed substantially parallel with said tubular coil form for balancing the effect of said magnetic field upon said receiver coil in the absence of passage of metal impurities, plural bands of interconnected conductive material in the form of an etched circuit on flexible plastic backing disposed within said tubular coil form, forming a Faraday shield, a short length of wire disposed in the edge of said tubular coil form for offsetting the balance of the magnetic field upon said receiver coil, to sensitize the apparatus for response to small metal impurities, and means mounting said second coil form within said housing and outside said tubular coil form.

2. Apparatus as set forth in claim 1 wherein said mounting means comprises a pair of screws threaded into said end plates and said second coil form for adjustment of said balance coil external of said housing.

3. Apparatus as set forth in claim 1 wherein said mounting means comprises potting compound filling the space between said tubular coil form and said housing for firm support of said balance coil in relation to said transmitter and receiver coils.

4. Apparatus for the detection of metal impurities in a tubular conveyor system, comprising a housing, a tubular support within said housing, a pair of transmitter coils and a central receiver coil wound at axially spaced locations on said tubular support, plural bands of interconnected conductive material in the form of an etched circuit on flexible plastic backing axially disposed within said tubular support forming an electrostatic shield, a balance coil of tubular configuration disposed substantially parallel to said tubular support and between said tubular support and said housing, an RF generator for energizing said transmitter coils, an RF amplifier coupled to said receiver coil for developing a voltage output upon transit of a metal impurity, a differential amplifier coupled to said RF amplifier for providing high level voltage outputs, a one-shot circuit for developing a pulse of predetermined duration in response to each high level output from said differential amplifier, a power amplifier output circuit for directly driving a solenoid load and the like for intervals determined by the pulse width of said one-shot circuit, and a metal clip of U-shaped configuration inserted in one end of said tubular support, said clip being adapted to offset the balance of the magnetic fields to sensitize the apparatus for detection of small metal objects.

* * * * *